Figure 3:
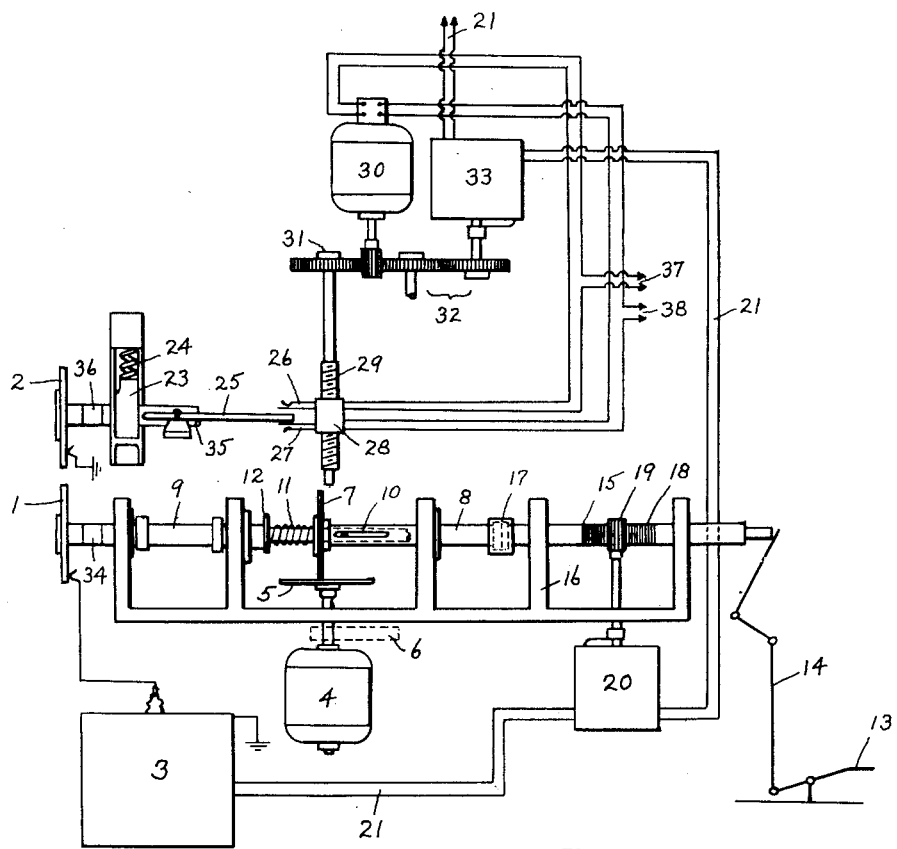

Oct. 16, 1951     J. T. G. MILNE     2,571,599
APPARATUS FOR JOINING THERMOPLASTIC MATERIAL
Filed July 25, 1947     2 SHEETS—SHEET 1
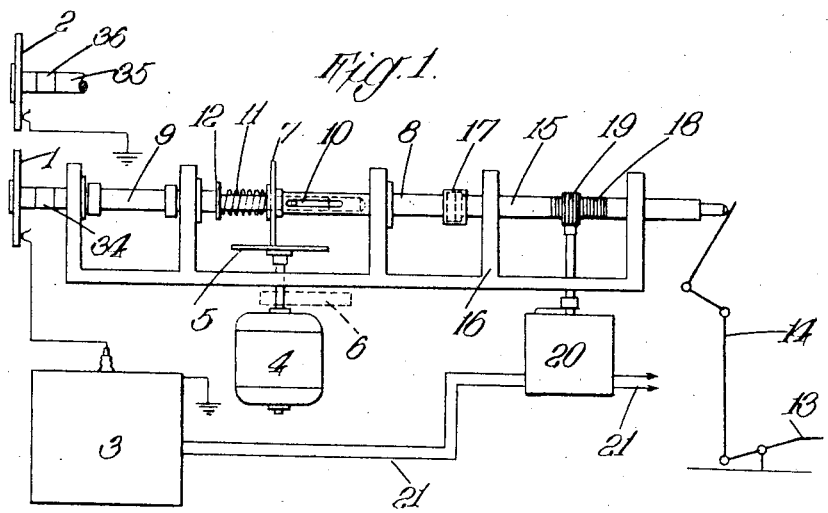
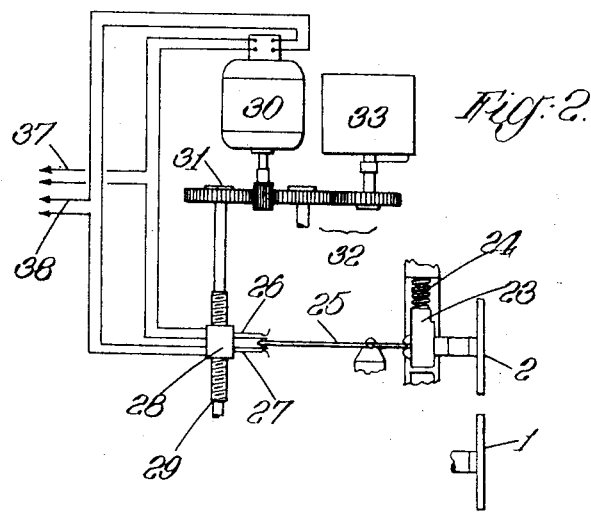
Inventor:
James Terence Geddes Milne
By *J. C. Ollier*
Attorney.

Patented Oct. 16, 1951

2,571,599

UNITED STATES PATENT OFFICE 2,571,599

APPARATUS FOR JOINING THERMOPLASTIC MATERIAL

James Terence Geddes Milne, Hatch End, Middlesex, England, assignor to Electric & Musical Industries Limited, Hayes, Middlesex, England, a company of Great Britain Application July 25, 1947, Serial No. 763,474
In Great Britain May 14, 1946

Section 1, Public Law 690, August 8, 1946
Patent expires May 14, 1966

7 Claims. (Cl. 219—47)

This invention relates to apparatus for joining thermoplastic material by heating such material with radio-frequency current.

Proposals have been made for joining together thermoplastic material, such as polyvinyl chloride sheet material, by causing said material to pass between a pair of rollers, radio-frequency oscillations being applied between the rollers so that the sheet material becomes heated due to dielectric losses and the heating, combined with the mechanical pressure exerted by the rollers, causes joining of the sheet material.

In such apparatus it is desirable that the speed at which the material is fed through the rollers can be varied by the operator at will, so that the operator may have more time to manipulate the material when for example it is required to join material by means of a curved seam or in some other way more intricate than joining by means of a straight seam. Similarly, if materials of different thicknesses are to be satisfactorily joined the rate at which heat is generated in the material ought to be varied according to the thickness of the material being joined. Difficulty is however encountered in effecting satisfactory joining when the speed at which the material is fed through the rollers varies or when the thickness of the material varies.

One object of the present invention is to provide improved apparatus for joining thermoplastic material by heating with radio-frequency oscillations, with a view to giving the operator facility to vary the rate of feed of the material at will.

Another object of the present invention is to provide improved apparatus for joining thermoplastic material by heating with radio-frequency oscillations with a view to obtaining satisfactory operation at different speeds and with different thicknesses of material to be joined.

In order that the said invention may be clearly understood and readily carried into effect, the same will now be more fully described with reference to the accompanying drawings, in which:

Figure 1 illustrates diagrammatically one example of an apparatus according to the invention, the apparatus comprising a so-called electronic sewing machine, Figure 2 illustrates diagrammatically part of an apparatus similar to that illustrated in Figure 1, and embodying another feature of the invention, and Figure 3 illustrates diagrammatically one example of apparatus according to the present invention combining features incorporated separately in Figures 1 and 2.

Referring to the drawing, the apparatus illustrated in Figure 1 is arranged so that the power of the radio-frequency oscillations employed for heating is controlled automatically in accordance with the speed of travel of the material between the electrodes. The electrodes comprise a pair of rollers 1, 2 and the sheets of material which are to be joined or seamed are caused to pass between the rollers where they are heated by radio-frequency oscillations generated in an oscillator indicated at 3 and applied between the rollers 1, 2. The material is also subjected to mechanical pressure between the rollers and the combined effect of the heating and pressing causes joining of the sheets of material. To cause the material to pass between the rollers, the latter are driven by a constant speed motor 4 via a disc 5, and another disc 7 secured to a shaft 8 and frictionally engaging the disc 5. Reduction gearing indicated by dotted lines at 6 may be interposed between the motor 4 and the disc 5 if desired. The shaft 8 is coupled to a further shaft 9 by means of a pin-and-slot coupling 10 or some other form of coupling which allows the shaft 8 to move longitudinally relatively to the shaft 9 while imparting rotation thereto, the roller 1 being carried by the shaft 9 and suitably insulated therefrom by an insulating section 34. The roller 2 is carried on a shaft 35 and similarly insulated by an insulating section 36, being driven also from the shaft 9 at the same speed but in reverse direction to the roller 1, by means of a transmission which is not shown but may be of any suitable kind. The roller 2 will usually be mounted in such a way that the separation between the rollers 1 and 2 can be varied to allow for different thicknesses of material passing between the rollers. Longitudinal movement of the shaft 8 causes the point of engagement of the disc 7 with the disc 5 to be altered so that the speed of rotation of the rollers 1, 2 can be altered, a spring 11 which bears against the disc 7 and against a collar 12 urging the disc to a limiting position at which the speed of the rollers 1, 2 is a minimum.

To enable the speed of rotation of the rollers to be varied under the control of the operator, a pedal 13 is provided which when depressed is arranged to displace the shaft 8 longitudinally by means of link mechanism indicated diagrammatically at 14, the link mechanism bearing against one end of a bar 15 slidable in the frame 16 of the machine. The bar 15 has a bearing 17 at its other end in which the shaft 8 is rotatably mounted but held axially so that the shaft 8 and bar 15 are coupled together for longitudinal movements. The operator can therefore increase the speed at which the material is moved past the rollers 1, 2 by depressing the pedal 13, the speed being automatically reduced to its minimum by the action of the spring 11 when the pedal is released. Automatic adjustment of the amplitude of the radio-frequency current induced in the material by means of the oscillations generated in the oscillator 3 is effected by means of a rack 18 on the bar 15, which is engaged by a pinion 19 arranged when rotated to operate an adjustable transformer 20 which may be of the kind known by the registered trademark "Variac." The transformer is included in the supply leads 21 of the oscillator, the supply being applied to the primary winding of the high-tension transformer in the oscillator 3. Therefore when the transformer 20 is adjusted, the effect is to vary the amplitude of the oscillations generated by the oscillator 3 and applied between the rollers 1, 2. The amplitude of the current induced in the material is therefore controlled automatically in accordance with the speed of travel of the material past the rollers 1, 2. Owing to the heat losses due to conduction and the like, the relation between the speed of the rollers and the heat required to be developed for joining or seaming the material is unlikely to be a linear one, and to allow for such a non-linear relationship a cam mechanism may be interposed between the bar 15 and the adjustable transformer 20.

Figure 2 diagrammatically illustrates mechanism for varying automatically the amplitude of the radio-frequency current induced in the material between the rollers 1, 2 in accordance with the thickness of the material. The mechanism may be embodied in apparatus similar to that illustrated in Figure 1 in which however there is no mechanism for varying the power of the radio-frequency oscillations employed for heating in accordance with the speed of travel of the material. The roller 2 as indicated is journalled in a bearing 23 which allows the separation of the roller 2 from the roller 1 to vary but the roller 2 is resiliently pressed towards the roller 1 by a spring 24, and in the absence of material between the rollers is held by a stop at a distance from the roller 1 which is rather less than the minimum thickness of material which is intended to pass between the rollers. The separation of the rollers therefore becomes adjusted automatically in accordance with the thickness of material passing between them, and a lever 25 is linked to the bearing 23 at one end so that it follows movements of the roller and has its longer arm projecting between two pairs of contacts 26 and 27 carried by a follower device comprising a nut 28 threaded on a screw shaft 29. The contact pairs 26 and 27 are respectively included in current supply leads 37 and 38 of a motor 30 which may be of the kind known as a split-field motor the leads 37 and 38 being so arranged that if the contacts 26 are closed, say, the motor is driven in one direction and drives the shaft 29 via reduction gearing 31 in such a sense as to raise the nut 28 until the lever 25 is out of engagement with the contacts 26 whereupon the supply to the motor is switched off. Similarly, if the lever 25 engages and closes the contacts 27 the current is supplied to the motor so that it is driven in the reverse direction and the nut 28 is lowered until the contacts 27 are opened. The motor 30 is arranged also to drive, by means of gearing indicated at 32, an adjustable transformer 33 which may be similar to the transformer 20, and when adjusted varies the amplitude of the oscillations generated by the oscillator 3. Therefore if the thickness of the material between the rollers 1, 2 varies and causes the separation of the rollers to vary, as for example if an additional sheet, or thickness, of material is passed between the rollers, the lever 25 is moved from a neutral position in which it lies between the contact-pairs 26, 27 without closing either pair, into a position in which it closes one or other of the contact-pairs and causes the motor 30 to be driven until the lever 25 is again in a neutral position, the motor causing an adjustment of the transformer 33 which in turn produces a variation in the power of the radio-frequency oscillations employed for heating, in accordance with the variation in the separation of the rollers. Since the variations in thickness of the material will in general be slight, multiplying link mechanism may be interposed between the bearing 23 and the lever 25.

The apparatus illustrated in Figure 3 combines the features separately illustrated in Figures 1 and 2, and parts in Figure 3 corresponding to parts in Figures 1 and 2 bear the same reference numerals. The adjustable transformers 20 and 33 are included in series in the supply leads 21 so that the power output of the oscillator is automatically controlled in response to any speed variations effected by the operator and also in response to any substantial change in the thickness of the material passing between the electrodes.

Other suitable feeling devices may also be employed for detecting variations in the thickness of the material, instead of the rollers 1 and 2, and the movement of the feeling device may be transmitted to the means for varying the amplitudes of the oscillator by other mechanism than that illustrated. It will also be understood that other means, for example, an adjustable condenser or inductance, may be employed instead of an adjustable transformer for controlling the power of the radio-frequency oscillations employed for heating whether it be in accordance with the speed of travel of the material or the thickness thereof. In some modifications the variation in power of the radio-frequency oscillations may be accompanied by a change in the frequency of the oscillator, but this will not affect the operation of the apparatus. Other modifications may also be made in the apparatus illustrated in Figures 1 and 2 for example the rollers 1, 2 may be replaced by a single roller which causes the material to be fed between said roller and a stationary foot between which and said roller the radio-frequency oscillations are applied, or the electrodes may take the form of a pair of feet which are arranged to be operated in such a way that they are alternately moved towards each other so that they press the material between them and then moved apart so as to release the material, the electrodes while the material is pressed between them being caused to move a short distance at right angles to said first movements so as to feed the material a short distance forward, and while they are separated the electrodes being caused to retrace the last said movement. The material is therefore fed step-by-step past the electrodes and is joined by a succession of joining operations on short lengths of the material.

What I claim is:

1. Apparatus for joining thermoplastic material by heating the material with electrical radio-frequency oscillations, comprising an electrical radio-frequency oscillator, a pair of electrodes, means for applying oscillations from said oscillator between said electrodes to set up a high frequency electric field, means for feeding thermoplastic material to be joined through said field, and manual means under control of the operator for simultaneously controlling the speed of the material through said field and effecting a corresponding variation in the power output of the oscillator.

2. Apparatus for joining thermoplastic material by heating the material with electrical radio-frequency oscillations, comprising an electrical radio-frequency oscillator, a pair of electrodes, means for applying oscillations from said oscillator between said electrodes, means for feeding thermoplastic material to be joined at a predetermined speed past said electrodes, and means including a pedal under control of the operator for simultaneously adjusting the speed of the material and effecting a corresponding variation in the power output of the oscillator.

3. Apparatus for joining thermoplastic material by heating the material with electrical radio-frequency oscillations, comprising an electrical radio-frequency oscillator, a pair of roller electrodes, means for applying oscillations from said oscillator between said electrodes, means for rotating at least one of the electrodes to feed thermoplastic material past the electrodes, means for urging the electrodes toward each other, a follower device, means including a reversible electric motor for displacing said follower device selectively in opposite directions, a supply circuit for driving said motor in one direction and including a pair of normally open contacts mounted on said follower device, a second supply circuit for driving said motor in the reverse direction and including a second pair of normally open contacts mounted on said follower device, means responsive to variations in the separation between said electrodes for selectively closing one or the other of said contacts, whereby said motor will rotate to displace the follower device in the selected direction, and means responsive to displacement of said follower device for automatically varying the power output of the oscillator.

4. Apparatus for joining thermoplastic material by heating the material with electrical radio-frequency oscillations, comprising a radio-frequency oscillator, a pair of roller electrodes, means for applying oscillations from said oscillator between said electrodes, a driving motor, a disc driven by said motor, a second disc having its periphery in frictional engagement with a face of said first disc and being displaceable radially of said first disc, a pedal, a coupling between said pedal and said second disc for displacing the second disc, and means responsive to displacement of the second disc for varying the power output of said oscillator.

5. Apparatus for joining thermoplastic material by heating the material with electrical radio frequency oscillations, comprising a pair of electrodes, an electrical radio frequency oscillator for applying oscillations between said electrodes to set up a high frequency electric field, means for feeding thermoplastic material to be joined through said field, manually controlled mechanical means for simultaneously controlling the speed of feed of the material through said field and effecting a corresponding variation in the power of the oscillations from said oscillator, and means responsive to variations in the thickness of the material passing through said field for automatically effecting a corresponding variation in the power of the oscillations from said oscillator.

6. Apparatus for joining thermoplastic material by heating the material with electrical radio frequency oscillations, comprising a pair of electrodes, an electrical radio frequency oscillator for applying oscillations between said electrodes to set up a high frequency electric field, means for feeding thermoplastic material to be joined through said field, and manually controlled means under control of the operator for simultaneously controlling the speed of feed of the material through said field continuously over a range of values and correspondingly varying the power of oscillations from said oscillator.

7. Apparatus for joining thermoplastic material by heating the material with electrical radio-frequency oscillations, comprising an electrical radio-frequency oscillator, a pair of electrodes, means for applying oscillations from said oscillator between said electrodes to set up a high frequency field, means for feeding thermoplastic material to be joined through said field between said electrodes, a yieldable mounting for one of said electrodes to allow material of different thicknesses to pass between said electrodes, a follower device for said latter electrode, and motor means responsive to variations in thickness of material between said electrodes for simultaneously driving said follower device to follow movements of the latter electrode and for effecting a corresponding variation in the power of the oscillations applied between said electrodes.

JAMES TERENCE GEDDES MILNE.

REFERENCES CITED

The following references are of record in the file of this patent:

UNITED STATES PATENTS

| Number | Name | Date |
| --- | --- | --- |
| 1,023,316 | Hurwitz | Apr. 16, 1912 |
| 1,835,907 | Shiland | Dec. 8, 1931 |
| 2,064,589 | Convers | Dec. 15, 1936 |
| 2,236,998 | Gillette | Apr. 1, 1941 |
| 2,251,277 | Hart et al. | Aug. 5, 1941 |
| 2,315,264 | Logan | Mar. 30, 1943 |
| 2,391,086 | Crandell | Dec. 18, 1945 |
| 2,421,295 | Silvertsen | May 27, 1947 |
| 2,453,680 | Sweeny | Nov. 9, 1948 |
| 2,473,143 | Graham et al. | June 14, 1949 |

OTHER REFERENCES

Hoyler: "An Electronic Sewing Machine," Electronics, August 1943, pages 90–93, 160, 162, 164, 166 and 168 (particularly pages 91 and 92).

Zade: "Welding Thermoplastics with High Frequency," Plastics, September 1944, pages 30, 32, 95 and 96 (particularly page 30).

"Radio Sealing," Wireless World, January 1945, page 29.